United States Patent
Emunds

(10) Patent No.: US 9,669,920 B2
(45) Date of Patent: Jun. 6, 2017

(54) CASING FOR A LIFTING AID

(75) Inventor: Rolf Emunds, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/293,570

(22) Filed: Nov. 10, 2011

(65) Prior Publication Data
US 2012/0112011 A1 May 10, 2012

Related U.S. Application Data

(60) Provisional application No. 61/177,831, filed on May 31, 2009.

(30) Foreign Application Priority Data

May 13, 2009 (DE) .................... 10 2009 003 084

(51) Int. Cl.
| | | |
|---|---|---|
| B64C 23/06 | (2006.01) | |
| B64C 7/00 | (2006.01) | |
| B64C 9/02 | (2006.01) | |
| B64C 9/16 | (2006.01) | |

(52) U.S. Cl.
CPC .............. B64C 7/00 (2013.01); B64C 9/02 (2013.01); B64C 9/16 (2013.01); B64C 23/06 (2013.01)

(58) Field of Classification Search
USPC ......................................... 244/201
See application file for complete search history.

(56) References Cited

U.S. PATENT DOCUMENTS

| | | | |
|---|---|---|---|
| 3,578,264 A * | 5/1971 | Kuethe ................. | 244/200.1 |
| 3,744,745 A | 7/1973 | Kerker et al. | |
| 4,019,696 A * | 4/1977 | Hirt et al. ............. | 244/200.1 |
| 4,354,648 A * | 10/1982 | Schenk et al. ........ | 244/200.1 |
| 4,466,587 A * | 8/1984 | Dusa et al. ............ | 244/121 |
| 4,540,143 A | 9/1985 | Wang et al. | |
| 4,712,750 A | 12/1987 | Ridgwell | |
| 4,854,528 A | 8/1989 | Hofrichter | |
| 6,126,118 A * | 10/2000 | Fujino et al. ......... | 244/130 |
| 6,964,397 B2 * | 11/2005 | Konings ............... | 244/199.1 |
| 7,866,608 B2 * | 1/2011 | Atinault ................ | 244/199.1 |
| 7,988,092 B2 | 8/2011 | Bonnaud et al. | |
| 2005/0011993 A1 | 1/2005 | Konings | |
| 2008/0067292 A1 * | 3/2008 | Bonnaud et al. ..... | 244/199.1 |

(Continued)

FOREIGN PATENT DOCUMENTS

| | | |
|---|---|---|
| DE | 3641247 A1 | 6/1988 |
| EP | 1627811 A1 | 2/2006 |
| FR | 2905930 A1 | 3/2008 |

(Continued)

OTHER PUBLICATIONS

International Search Report for Application No. PCT/EP2010/056374 dated Mar. 3, 2011.

(Continued)

*Primary Examiner* — Marc Burgess
(74) *Attorney, Agent, or Firm* — Jenkins, Wilson, Taylor & Hunt, P.A.

(57) ABSTRACT

A casing for a lifting aid for an aircraft, comprising at least one strake which extends essentially in a protruding manner in the direction of flight in relation to an outer surface of the casing. An aircraft including a lifting aid and such a type of casing.

17 Claims, 5 Drawing Sheets

(56) References Cited

U.S. PATENT DOCUMENTS

2009/0261198 A1   10/2009   Bonnaud et al.

FOREIGN PATENT DOCUMENTS

| FR | 2930235 | A1 | 10/2009 |
| RU | 72198 | | 4/2008 |
| SU | 1391490 | | 4/1988 |

OTHER PUBLICATIONS

Russian Office Action for Application No. 2011145806/11 dated May 23, 2013.
Chinese Office Action for Application No. 201080021131.8 dated Sep. 24, 2013.
German Office Action for Application No. 102009003084 dated Apr. 13, 2012.

* cited by examiner

CASING FOR A LIFTING AID

CROSS-REFERENCE TO RELATED APPLICATIONS

This application is a continuation of and claims priority to PCT/EP2010/056374 filed May 10, 2010 which claims the benefit of and priority to U.S. Provisional Application No. 61/177,831, filed May 13, 2009 and German Patent Application No. 10 2009 003 084.0, filed May 13, 2009, the entire disclosures of which are herein incorporated by reference.

FIELD OF THE INVENTION

The present invention relates to a casing for a lifting aid for an aircraft, in particular for a flap track of an aircraft. The invention further relates to an aircraft with a lifting aid and a casing of this type.

Although applicable to any aircraft or spacecraft casings, the present invention and the problem on which it is based will be explained in greater detail with reference to flap track casings of jet engine commercial aircraft.

Aircraft of this type generally comprise so-called "landing flaps" which can be extended during the take-off and landing phases to provide increased aerodynamic lift at slow flight speeds. For this purpose, the landing flaps are usually arranged in the flap tracks on the underside of the aerofoils. In order to keep air resistance as low as possible at full cruising speed, the flap tracks are enclosed by corresponding aerodynamically optimised casings which can in addition be configured to produce aerodynamic lift.

In particular in the case of aircraft with jet engines located on the underside of the aerofoils, undesirable vibrations of the flap track casing can, however, occur owing to the effect of the propulsive jet of an engine. Along with spatial closeness of the engine and flap track casing, particular operating states of the aircraft can promote the occurrence of vibrations, for example if the aircraft is still on the ground during maximum thrust or accelerates while still on the runway. The vibrations can lead to damage, for example hairline cracks in the flap track casing or supports thereof, to the point of a complete breakdown of the structure in the pivot region.

SUMMARY OF THE INVENTION

It is therefore the object of the present invention to eliminate damaging effects of the propulsive jets on casings of lifting aids such as flap tracks.

The idea behind the present invention involves forming at least one strake which projects from an outer surface of the casing and extends substantially in the direction of flight. A strake is to be understood here as a planar (surface-optimised) structure such as a plate or plank.

Because the strake projects from the outer surface of the casing and extends substantially in the direction of flight of the aircraft, the strake obstructs aerodynamic fluxes on the outer surface of the casing which comprise significant flux components perpendicular to the direction of flight. In this way, if the casing dips into the propulsive jet, for example during the take-off phase, the formation of unstable, oscillating vortex systems due to flux components of this type are suppressed and a stable aerodynamic flux is produced and flows around the casing. Because of the presence of oscillating vortex systems, no significant oscillating pressure variations and therefore no forces causing damaging vibrations occur on the outer surface of the casing.

According to a preferred development, the strake projects substantially vertically from the outer surface. Flux components extending transverse to the strake are thus particularly effectively obstructed on both sides.

According to a preferred development, the strake forms an angle of between 0° and 40° with a vertically downward direction. This has the effect that in the case of oncoming flow, a transverse force is applied which displays no zero passages, so that the casing and strake are particularly gently loaded in only one direction.

According to a preferred development, the strake has a length of from 1 m to 3 m along the outer surface of the casing. A strake of this length adequately stabilises the aerodynamic flux in the case of low inherent weight.

According to a preferred development, the strake comprises a leading edge on its front end and/or a trailing edge on its back end, which extend perpendicular to the outer surface of the casing. This produces a controlled oncoming flow of the leading edge or a controlled stall of the trailing edge.

According to a preferred development, the strake has a lower height at its front end than at its back end. The height of the strake at its front end is preferably 1 cm or less, so that the formation of vortices on the leading edge is eliminated.

According to a preferred development, the strake has a height of 15 cm or less at its back end. A strake of this height stabilises the aerodynamic flux adequately in the case of sufficient inherent stability and low inherent weight. Preferably, the strake has a maximum height at a position at a distance from its front and back ends.

According to a preferred development, the strake has a thickness between 2 mm and 5 mm. This enables a high stability of the strake in the case of low weight. The strake preferably has a substantially rectangular transverse profile. This enables a controlled stall on the upper edge.

According to a preferred development, the invention provides an aircraft with a lifting aid which comprises a casing of this type. The aircraft preferably comprises a propulsive jet that is arranged in such a way that during the operating phase of the aircraft, the casing at least partially dips into a jet of the jet engine. In this way, jet engines and lifting aids can be optimised in their position without constructive restrictions and without the occurrence of damage to the casing.

According to a preferred development, the strake is formed on one of the sides of the casing which faces the jet. The strake thus works particularly efficiently, directly at the location of the direct oncoming flow via the propulsive jet.

The invention will be further explained using embodiments with reference to the accompanying figures.

DESCRIPTION OF EXEMPLARY EMBODIMENTS

Figure 1A:
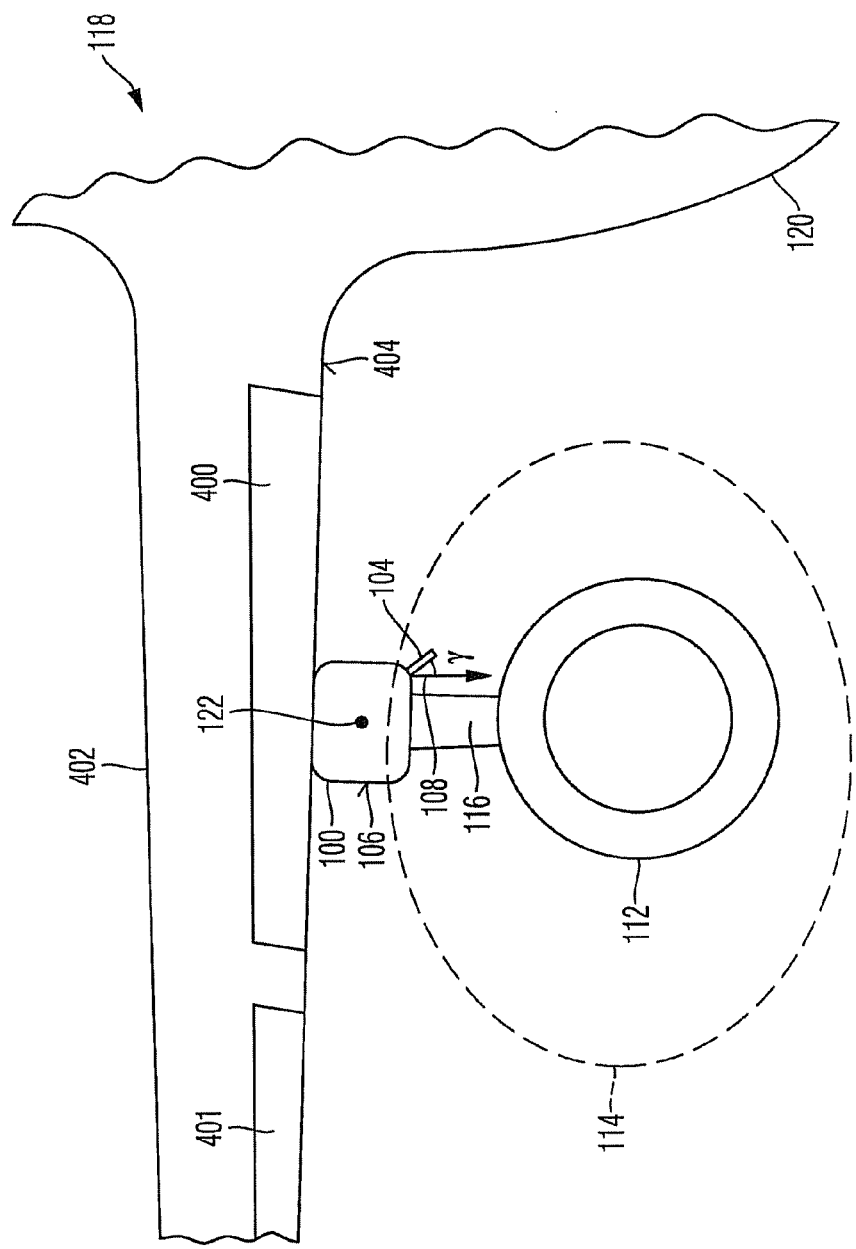
FIGS. 1A-B are sectional views in the direction of flight of an aircraft aerofoil having a casing in accordance with two embodiments of the invention.

In the figures, the same reference numerals denote identical or functionally identical components, unless indicated otherwise.

FIG. 1A is in a schematic rear view of a portion of an aerofoil 402 of a jet-driven commercial aircraft 118, which aerofoil is fixed on a fuselage 120 of the aircraft 118. The viewing direction of the viewer corresponds to the direction of flight of the aircraft 118. On its trailing edge 404 which is facing the viewer, the aerofoil 402 comprises landing flaps 400, 401 which are supported so as to be retractable from a flap track as a lifting aid. The flap track itself is enclosed by a casing 100 and is not shown in the drawing of FIG. 1A. The flap track casing 100 extends substantially in the direction of flight along a portion of the underside of the aerofoil 402, in the present case, for example, from approximately the centre of the aerofoil 402 as far as its trailing edge 404 or marginally beyond this.

Likewise, an engine mount 116 is fixed on the underside of the aerofoil 402 near the flap track casing 100, and holds a jet engine 112 of the aircraft 118. During operation the jet engine 112 produces a propulsive jet 114 counter to the direction of flight, the cross-section and direction of which depend on the operating state of the aircraft 118. The dashed line in FIG. 1A marks highly schematically a cross-section of the propulsive jet 114 in the region of the trailing edge 404 of the aerofoil during operation of the jet engine 112 on the ground, for example when it is not moving, or during acceleration on the ground during take-off. In this operating state, the propulsive jet 114 is deflected outwards under the effect of the ground, the landing flap casing 100 dipping partially into the propulsive jet 114, and to a greater extent when the casing 100 of the flap track is lowered further towards the bottom than shown, in order to extend the landing flaps 400, 401.

In the present embodiment the flap track casing 100 is arranged at substantially the same distance from the aircraft fuselage 120 as the engine mount 116, purely by way of example. The engine mount 116 can, for example, comprise an engine mount casing which transitions into the casing 100 of the flap track.

On the outer surface 106 of the flap track casing 100 a strake 104 is fixed on the side facing the jet 114, meaning in this case on the internal side of the board, the outwardly deflected jet of which encounters the casing 100, which strake extends along the outer surface 106 of the casing 100 in the direction of flight and finishes in an approximately vertical trailing edge on the outer surface 106 at its end which is turned towards the viewer. The strake 104 extends in a plane which forms an angle γ of approximately 40° with the vertically downward direction 108 and is substantially vertical on the outer surface 106 of the casing. With respect to a longitudinal axis 122 of the casing 100, the plane of the strake 104 extends substantially radially.

Figure 1B:
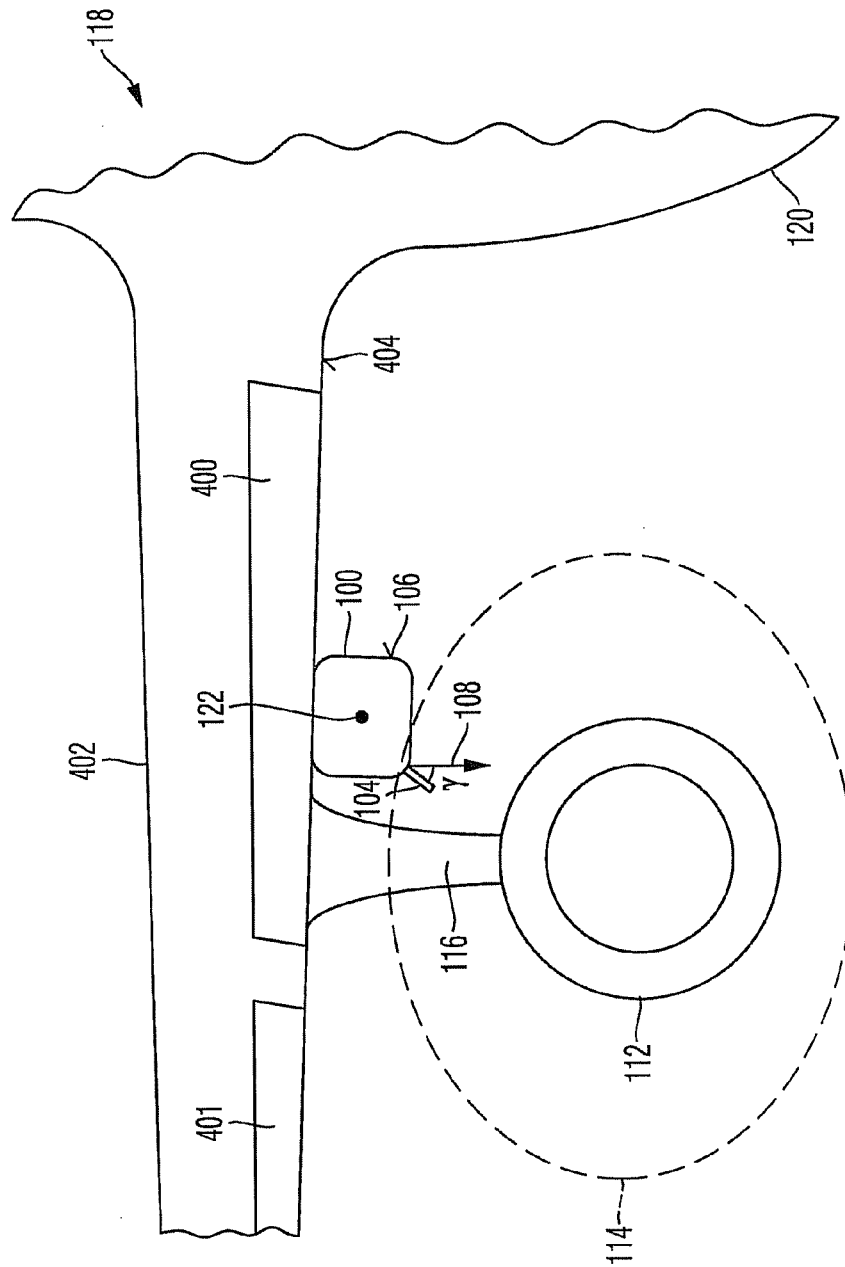

FIG. 1B shows an alternative embodiment in which, by way of example, the flap track casing 100 is arranged offset in relation to the engine mount 116 in the direction of the internal side of the board, that is to say towards the fuselage 120. It is assumed here that the flap track casing 100 and the engine mount 116 are offset at a distance in this way so that during operation of the jet engine 112 on the ground and outward deflection of the jet 114 due to the divergence of the jet 114 from the external side of the board, the propulsive jet 114 encounters the casing 100. A strake is fixed on the outer surface 106 of the flap track casing 100 on the side facing the jet 114, meaning in this case on the external side of the board.

Figure 4:
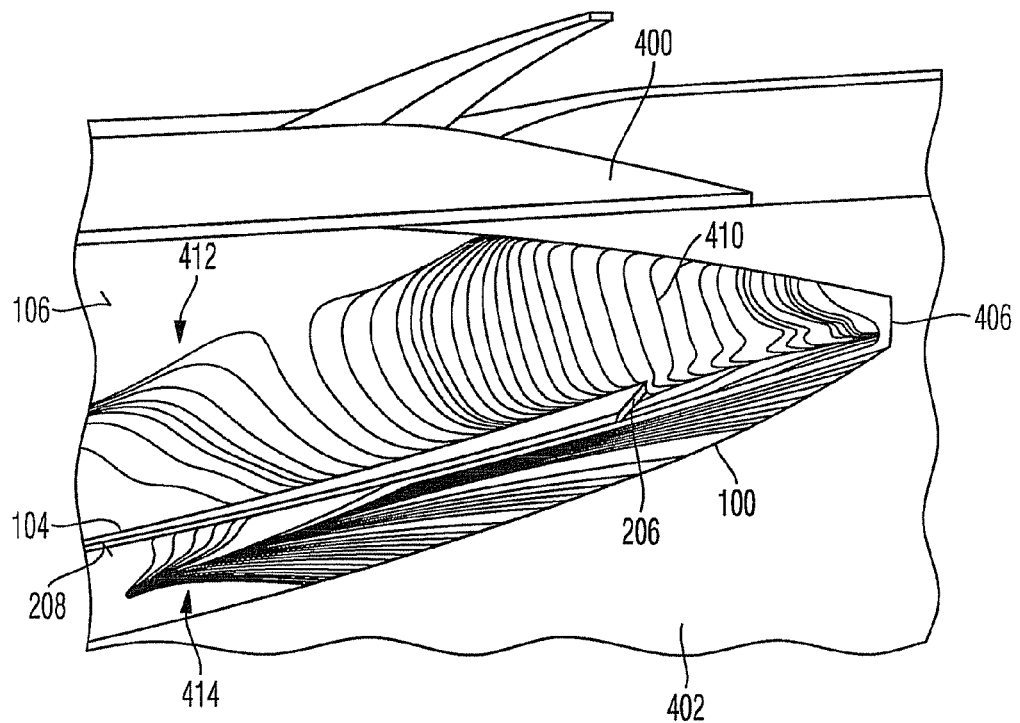
FIG. 4 is a perspective view of a back portion of a casing in accordance with an embodiment, with simulated flow.

FIG. 4 is a perspective view of a back portion of a flap track casing 100 in accordance with a further embodiment which is based on the casing of the furthest outside located flap track of the Airbus A380. In this type of aircraft, the outermost engine is arranged at an equal distance from the aircraft fuselage and the flap track casing 100 shown. A strake 104 has been attached to the internal side of the board, seen by the viewer of FIG. 4, which strake extends over a length of 3 m along the outer wall 106 of the casing, stands vertically thereon and forms an angle γ=20° with the vertically downward direction. The landing flap 400 is shown in a lowered position, in which the casing 100 dips into the propulsive jet of the engine during operation thereof.

Furthermore, flux lines 410 are shown in FIG. 4, which have been numerically calculated by a hybrid Navier-Stokes method common in fluid mechanics, in order to simulate the aerodynamic flux around the casing 100 in the position shown, upon full thrust of the engine on the ground. A first group 414 of flux lines indicates a flow on the bottom wall of the casing 100, which flow is orientated substantially along the strake 104 in the direction of flight as far as the back end 406 of the casing 100. A second group 412 of flux lines indicates a flow on the board internal side wall of the casing 100, which flow is also directed substantially along the strake 104 in the direction of flight as far as the back end 406 of the casing 100 where it combines with the flow of the first group 414. There is a stable flow without oscillations that cause vibrations. In addition, the flow shown produces an initial stress of the casing 100 directed towards the internal side of the board (to the viewer), which, irrespective of the existence of oscillations, prevents the material of the casing 100 from being loaded alternately in compression and tension, and thus prevents material fatigue.

Figure 5:
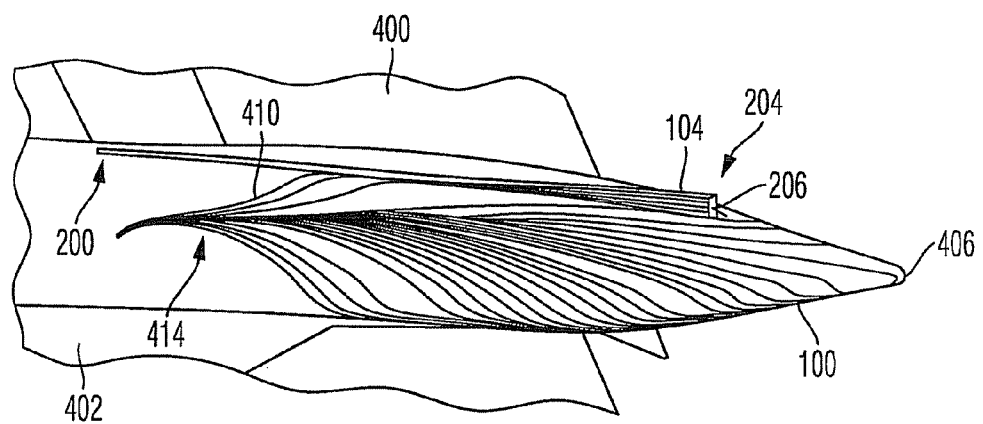
FIG. 5 is a bottom view of the portion of the casing from FIG. 4, with simulated flow.

FIG. 5 is a bottom view of the portion of the casing from FIG. 4 with the simulated flow of the simulation from FIG. 4. The curve of the strake can clearly be recognised, the trailing edge 206 of which at its back end 204 is higher than the leading edge at the front end 200 of the same strake.

Figure 6:
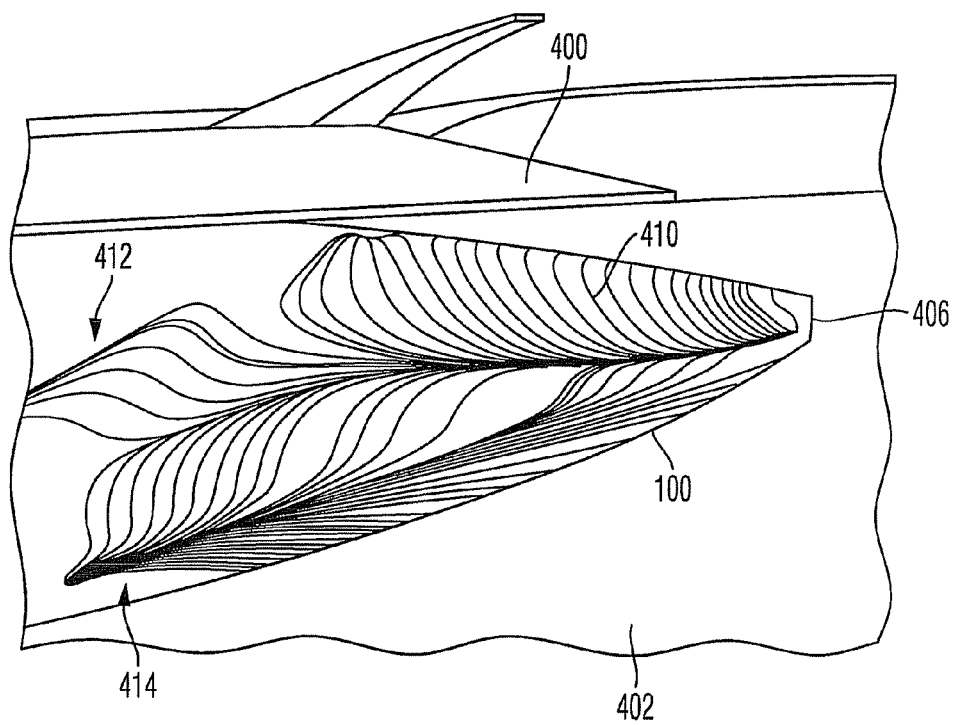
FIG. 6 is a perspective view of a back portion of a conventional casing, with simulated flow.
Figure 7:
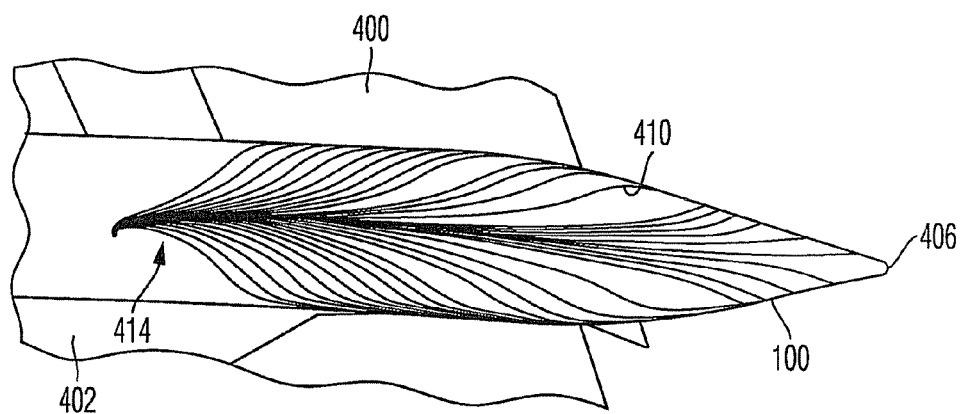
FIG. 7 is a bottom view of the portion of the casing from FIG. 6, with simulated flow.

FIGS. 6 and 7 show for comparison a back portion of a conventional landing flap casing, with simulated flow according to the same method as in FIGS. 4 and 5. The configuration shown corresponds to the conventional casing of the outermost flap tracks of the Airbus A380.

The first group 414 of flux lines, which flows along the bottom wall of the casing, comprises a considerable number of flux lines with components orientated upwards in the direction of the side wall of the casing 100. The second group 412 of flux lines which flows along the casing 100 on the side wall also comprises a considerable number of flux lines with components orientated downwards towards the floor wall. The flux fields formed by the first group 414 and second group 412 meet in the region of the radius of the casing 100, which radius is inside the board, to form an unstable vortex system which, according to the given local distribution of compression, hunts around the radius which connects the floor and side wall of the casing 100. The unstable vortex system leads to an oscillating pressure distribution on the upper surface of the casing, which distribution causes material-damaging vibrations.

Figure 2:
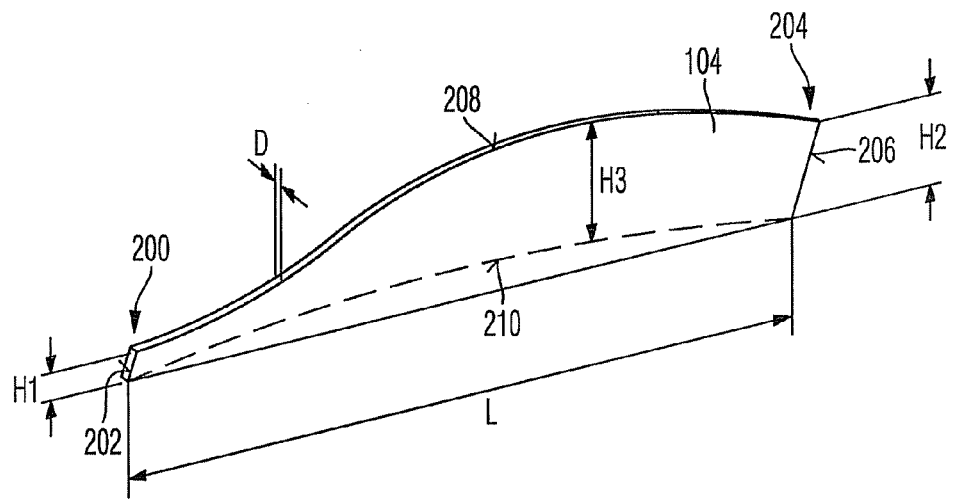
FIG. 2 is a schematic perspective view of a strake of a casing in accordance with an embodiment.

FIG. 2 is a schematic perspective view of a strake of a casing according to an embodiment, for example the embodiment from FIG. 1. The strake 104 has a rectangular cross-sectional profile of thickness D and a rectangular upper edge 208. A lower edge 210 is fit to the contour curve of the outer surface of the flap track casing. On the leading end 200 the strake begins with a leading edge 202 substantially perpendicular to the outer surface of the casing, which edge is of height H1, extends along the upper edge 208 over its length in the form of a spline which reaches a maximum height H3 in a position at a distance from both ends, and finishes at the back end 204 of the strake with a trailing edge which is also substantially vertical on the outer surface of the casing 100 and has the height H2.

Figure 3:
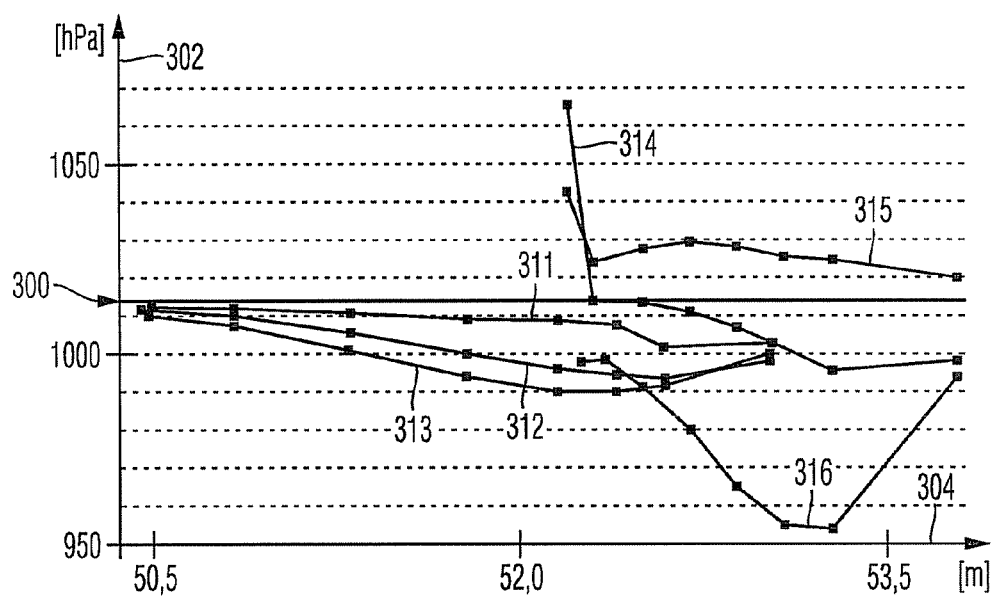
FIG. 3 shows simulated function curves of pressure distributions on strakes of casings in accordance with different embodiments.

FIG. 3 shows simulated function curves of pressure distributions on differently formed strakes which all correspond to the basic form described by means of FIG. 2, assuming that the thickness D is always 3 mm, the height H1 is always 1 cm, and the height H2 is always 15 cm. In each case, the simulation is based on a configuration such as those shown in FIGS. 4 to 7, irrespective of the form of the strake.

The curves 311 to 313 each correspond to a strake of length L=300 cm, the longitudinal coordinates along the horizontal axis 304 denoting the distance from the centre of the aerodynamic system of the aircraft. The strake forms an angle of γ=0° with the downward vertical in the case of curve 311, an angle of γ=30° in the case of curve 312, and an angle of γ=20° in the case of curve 312. Along the vertical axis 302, each curve shows the pressure distributions on the strake at the respective longitudinal coordinates, the atmospheric pressure 300 having been marked separately on the bottom.

In the case of curves 314 to 316, a strake of length L=203 cm has been assumed, which is arranged further towards the back end of the casing, as can be seen from the longitudinal coordinates. The strake forms an angle of γ=0° with the downward vertical in the case of curve 314, an angle of γ=20° in the case of curve 315, and an angle of γ=40° in the case of curve 316. A particularly advantageous pressure distribution is shown by curve 313, in which the pressure varies gently over the length of the strake and the line of the atmospheric pressure 300 is not crossed, so that the strake and the casing are not exposed to varying pressure and tensile stresses.

A strake of this type can, for example, be produced from a composite material and connected to the outer wall of the casing by means of fastening elements integrated into this wall.

Although the present invention has presently been described on the basis of preferred embodiments, it is not restricted thereto, but can be modified in many different ways.

For example, the invention can also be applied to types of lifting aids other than flap track casings, as well as to actual loads, inter alia, which are mounted underneath the aerofoils or in other places which are accessible to the propulsive jet of a jet engine.

LIST OF REFERENCE NUMERALS 100 flap track casing
101 longitudinal axis of the casing
102 flap track
104 strake
106 outer surface
108 vertically downward direction
110 transverse profile
112 jet engine
114 jet
116 engine mount casing
118 aircraft
120 aircraft fuselage
200 front end of the strake
202 leading edge
204 back end of the strake
206 trailing edge
208 upper edge
210 lower edge
300 atmospheric pressure
302 simulated pressure distribution
304 x-coordinates of the aerodynamic system
311-316 pressure distribution curve
400, 401 landing flap
402 aerofoil
404 trailing edge of the aerofoil
406 back end of the casing
410 flux lines
412 flux on the side wall
414 flux on the floor wall
D thickness of the strake
H1 height of the leading edge
H2 height of the trailing edge
H3 maximum height
γ angle to downward vertical

The invention claimed is:

1. An aircraft, comprising:
   an engine mount;
   a lifting aid comprising a flap track casing arranged with an offset in a span wise direction in relation to the engine mount, the flap track casing having at least one strake which projects substantially in the direction of flight of the aircraft extending from an outer surface of the flap track casing, wherein the strake is configured to suppress formation of flux components of unstable, oscillating vortex systems on the outer surface of the casing; and
   a jet engine arranged such that a jet of the jet engine encounters, during operation of the jet engine and at least during take-off of the aircraft, the flap track casing such that the flap track casing dips, at least partially, into the jet.

2. The aircraft of claim 1, wherein the strake is in a form of a plate or plank of a substantially constant thickness.

3. The aircraft of claim 1, wherein the strake projects substantially vertically from the outer surface.

4. The aircraft of claim 1, wherein the strake is at an angle of between 0° and 40° to a downward vertical direction.

5. The aircraft of claim 1, wherein the strake comprises a lower edge facing the outer surface, wherein the lower edge is fit to a contour curve of the outer surface.

6. The aircraft of claim 5, wherein the lower edge is connected to the contour curve of the outer surface by fastening elements integrated into the surface.

7. The aircraft of claim 1, wherein the strake comprises an upper edge remote from the outer surface, wherein the upper edge extends in the form of a spline over the outer surface.

8. The aircraft of claim 1, wherein the strake comprises a leading edge at a front end of the strake and/or a trailing edge at a back end of the strake, which extend substantially vertically from the outer surface of the flap track casing.

9. The aircraft of claim 1, wherein the strake has a smaller height at a front end than at a back end of the strake.

10. The aircraft of claim 1, wherein the strake has a height of 1 cm or less on a front end of the strake.

11. The aircraft of claim 1, wherein the strake has a height of 15 cm or less on a back end of the strake.

12. The aircraft of claim 1, wherein the strake has a maximum height at a position at a distance from a front end and/or a back end of the strake.

13. The aircraft of claim 1, wherein the strake has a thickness of from 2 mm to 5 mm.

14. The aircraft of claim 1, wherein the strake has a substantially rectangular transverse profile on an upper edge.

15. The aircraft of claim 1, wherein the strake is formed as a planar or surface-optimised structure.

16. The aircraft of claim 1, wherein the strake has a length of from 1 m to 3 m along an outer surface of the strake.

17. The aircraft of claim 1, wherein the jet is configured to apply a transverse force to the strake so that the flap track casing is loaded by the jet in one direction with an initial loading which prevents the flap track casing from being loaded alternately in compression and tension.

\* \* \* \* \*